US012782546B2

(12) United States Patent
Khlat et al.

(10) Patent No.: US 12,782,546 B2
(45) Date of Patent: Nov. 3, 2026

(54) HYBRID GLOBAL LOCATION TRACKING SYSTEM

(71) Applicant: Qorvo US, Inc., Greensboro, NC (US)

(72) Inventors: Nadim Khlat, Cugnaux (FR); Billy Verso, Maynooth (IE)

(73) Assignee: Qorvo US, Inc., Greensboro, NC (US)

( * ) Notice: Subject to any disclaimer, the term of this patent is extended or adjusted under 35 U.S.C. 154(b) by 387 days.

(21) Appl. No.: 18/174,994

(22) Filed: Feb. 27, 2023

(65) Prior Publication Data

US 2023/0296753 A1 Sep. 21, 2023

Related U.S. Application Data

(60) Provisional application No. 63/389,983, filed on Jul. 18, 2022, provisional application No. 63/320,483, filed on Mar. 16, 2022.

(51) Int. Cl.
*G01S 13/87* (2006.01)
*G01S 13/76* (2006.01)

(52) U.S. Cl.
CPC .......... *G01S 13/878* (2013.01); *G01S 13/765* (2013.01); *G01S 13/767* (2013.01)

(58) Field of Classification Search
CPC .............. A45D 2026/009; A45D 26/00; A45D 26/0061; A46B 13/001; A46B 13/02;
(Continued)

(56) References Cited

U.S. PATENT DOCUMENTS 2,872,673 A 2/1959 Pleasure
4,242,653 A 12/1980 Moore
(Continued)

FOREIGN PATENT DOCUMENTS

CN 115967413 A 4/2023
EP 1016241 A2 7/2000
(Continued)

OTHER PUBLICATIONS

Hussain, Z., "Performance Evaluation of Wake-Up Radio Based Wireless Body Area Network," Master's Thesis, Degree Programme in Wireless Communications Engineering, University of Oulu, Oct. 2016, 58 pages.

(Continued)

*Primary Examiner* — Timothy X Pham
(74) *Attorney, Agent, or Firm* — Withrow & Terranova, P.L.L.C.

(57) ABSTRACT

A hybrid global location tracking system is disclosed. The hybrid global location tracking system includes an anchor device(s) and multiple tag devices, each including an ultra-wideband (UWB) transceiver circuit. The anchor device(s) can broadcast a location request to wake up the tag devices for location update. Each of the tag devices can measure a distance and an angle based on the received location request and report the measured distance and angle to the anchor device(s), either directly or through another tag device(s) located within communication range of the anchor device(s). Herein, the anchor device(s) can also determine its own global positioning coordinate and orientation. Accordingly, a global positioning location can be determined for each tag device based on the global positioning coordinate and the orientation of the anchor device(s), and the distance and angle reported by the tag device, without requiring a global positioning receiver in the tag device.

36 Claims, 4 Drawing Sheets

(58) Field of Classification Search
CPC . A46B 13/04; A46B 2200/1006; B26B 19/38; B26B 21/40; G01S 13/765; G01S 13/767; G01S 13/878; G01S 5/02
See application file for complete search history.

(56) References Cited

U.S. PATENT DOCUMENTS

| | | | |
|---|---|---|---|
| 4,682,358 | A | 7/1987 | Werner |
| 4,801,836 | A | 1/1989 | Mariani |
| 5,414,433 | A | 5/1995 | Chang |
| 5,774,091 | A | 6/1998 | McEwan |
| 7,155,263 | B1 | 12/2006 | Bergamo |
| 8,164,416 | B2 | 4/2012 | Lee et al. |
| 8,543,002 | B1 | 9/2013 | Mui |
| 9,386,524 | B2 | 7/2016 | Feuersaenger et al. |
| 9,537,543 | B2 | 1/2017 | Choi |
| 10,310,069 | B2 | 6/2019 | Younis |
| 10,663,559 | B2 | 5/2020 | Huemer et al. |
| 11,451,209 | B2 | 9/2022 | Gong et al. |
| 2005/0122944 | A1 | 6/2005 | Kwon et al. |
| 2005/0152305 | A1 | 7/2005 | Ji et al. |
| 2007/0015468 | A1 | 1/2007 | Kouki et al. |
| 2010/0159866 | A1 | 6/2010 | Fudge et al. |
| 2011/0140851 | A1 | 6/2011 | Lee et al. |
| 2011/0200026 | A1 | 8/2011 | Ji et al. |
| 2013/0141270 | A1 | 6/2013 | Rodenbeck et al. |
| 2014/0211678 | A1 | 7/2014 | Jafarian et al. |
| 2015/0081040 | A1 | 3/2015 | Apte et al. |
| 2015/0350027 | A1 | 12/2015 | Raissinia et al. |
| 2016/0173662 | A1 | 6/2016 | Seok |
| 2016/0337973 | A1 | 11/2016 | Park et al. |
| 2016/0344574 | A1 | 11/2016 | Choi et al. |
| 2017/0187415 | A1 | 6/2017 | Choi |
| 2017/0288639 | A1 | 10/2017 | Elsherbini et al. |
| 2017/0331456 | A1 | 11/2017 | Ono |
| 2018/0009112 | A1 | 1/2018 | Williams |
| 2018/0084501 | A1 | 3/2018 | Mu et al. |
| 2018/0110000 | A1 | 4/2018 | Shellhammer et al. |
| 2018/0132177 | A1 | 5/2018 | Gandhi et al. |
| 2018/0175905 | A1 | 6/2018 | Nabki et al. |
| 2018/0254925 | A1 | 9/2018 | Dutz et al. |
| 2019/0090191 | A1 | 3/2019 | Liu et al. |
| 2019/0116555 | A1 | 4/2019 | Kristem et al. |
| 2019/0162843 | A1 | 5/2019 | Jiang et al. |
| 2019/0215030 | A1 | 7/2019 | Nabki et al. |
| 2019/0306811 | A1 | 10/2019 | Balakrishnan et al. |
| 2020/0249351 | A1 | 8/2020 | Chen et al. |
| 2020/0252131 | A1 | 8/2020 | Jang et al. |
| 2020/0358422 | A1 | 11/2020 | Northcutt et al. |
| 2020/0363524 | A1 | 11/2020 | Yoon et al. |
| 2021/0119602 | A1 | 4/2021 | Lu et al. |
| 2021/0119606 | A1 | 4/2021 | Lu et al. |
| 2023/0007443 | A1* | 1/2023 | Moon ................. G01S 5/02213 |
| 2023/0035736 | A1 | 2/2023 | Bingesser et al. |
| 2023/0139079 | A1 | 5/2023 | McLaughlin et al. |
| 2024/0027576 | A1 | 1/2024 | Khlat et al. |
| 2024/0036158 | A1 | 2/2024 | Khlat |
| 2024/0103113 | A1* | 3/2024 | Qian ..................... G01S 5/0244 |
| 2024/0118375 | A1* | 4/2024 | Dong ..................... G01C 21/16 |
| 2024/0179494 | A1 | 5/2024 | Säily et al. |
| 2024/0219559 | A1* | 7/2024 | Shin ...................... H04W 4/023 |
| 2024/0259241 | A1 | 8/2024 | Liu et al. |
| 2025/0151018 | A1* | 5/2025 | Zhang ................... H04W 24/02 |

FOREIGN PATENT DOCUMENTS

| | | | |
|---|---|---|---|
| EP | 3993512 | A1 | 5/2022 |
| KR | 20200131526 | A | 11/2020 |
| WO | 2005033728 | A2 | 4/2005 |
| WO | 2016138483 | A1 | 9/2016 |
| WO | WO2020212723 | A1 * | 10/2019 |
| WO | 2021026657 | A1 | 2/2021 |
| WO | 2021209352 | A1 | 10/2021 |
| WO | 2022096351 | A1 | 5/2022 |
| WO | 2023081158 | A1 | 5/2023 |

OTHER PUBLICATIONS

Verso, B. et al., "Draft text for UWB wake-up radio," IEEE P802.15 Working Group for Wireless Personal Area Networks (WPANs), Nov. 2022, 7 pages.

Extended European Search Report for European Patent Application No. 24166667.6, mailed Jul. 10, 2024, 10 pages.

Biedka, M.M. et al., "Ultra-Wide Band Non-reciprocity through Sequentially-Switched Delay Lines," Scientific Reports, vol. 7, Article No. 40014, Jan. 2017, 16 pages.

Lee, H.L. et al., "Compact Antenna Module With Optimized Tx-to-Rx Isolation for Monostatic RFID," IEEE Microwave and Wireless Components Letters, vol. 27, No. 2, Dec. 2017, IEEE, pp. 1161-1163.

Lurz, F. et al., "Reader Architectures for Wireless Surface Acoustic Wave Sensors," Sensors, vol. 18, No. 6, May 2018, MDPI, 34 pages.

Sipos, D. et al., "SFCW Radar with an Integrated Static Target Echo Cancellation System," Sensors (Basel), vol. 21, No. 17, Sep. 2021, MDPI, 23 pages.

Dissanayake, A. et al., "A-108dBm Sensitivity, -28dB SIR, 130nW to 41μW, Digitally Reconfigurable Bit-Level Duty-Cycled Wakeup and Data Receiver," 2020 IEEE Custom Integrated Circuits Conference (CICC), Mar. 22-25, 2020, Boston, MA, USA, IEEE, 4 pages.

Goe, C. et al., "The Advantages of UWB Wakeup," Project: IEEE P802.15 Working Group for Wireless Specialty Networks (WSN), May 2022, IEEE, 14 pages.

Hoang, H. et al., "A Cluster-Based Protocol for Self-Organizing UWB Wireless Ad hoc Sensor Networks," Proceedings of the 2009 IEEE International Conference on Systems, Man, and Cyberneticsm Oct. 2009, San Antonio, TX, USA, IEEE, 6 pages.

Klumperink et al., "N-path filters and Mixer-First Receivers: A Review," 2017 IEEE Custom Integrated Circuits Conference (CICC), Apr. 30, 2017-May 3, 2017, Austin, TX, USA, IEEE, 8 pages.

Mclaughlin, M. et al., "UWB Wakeup Signalling," Project IEEE P802.15 Working Group, Nov. 2021, IEEE, 25 pages.

Moody, J. et al., "A-106dBm 33nW Bit-Level Duty-Cycled Tuned RF Wake-up Receiver," IEEE Solid-State Circuits Letters, vol. 2, Issue 12, Dec. 2019, IEEE, 2 pages.

Salonidis, T. et al., "Distributed Topology Construction of Bluetooth Personal Area Networks," Proceedings of IEEE Infocom 2001, Conference on Computer Communications, Twentieth Annual Joint Conference of the IEEE Computer and Communications Society (Cat. No. 01CH37213), Apr. 22-26, 2001, Anchorage, AK, USA, IEEE, 10 pages.

International Search Report and Written Opinion for International Patent Application No. PCT/US2022/048600, mailed Feb. 1, 2023, 17 pages.

ISO/IEC, "Information Technology—Radio Frequency Identification (RFID) for Item Management—Part 6: Parameters for Air Interface Communications at 860-930 MHz," ISO/IEC CD 18000-6, May 4, 2002, 129 pages.

Extended European Search Report for European Patent Application No. 22205008.0, mailed Mar. 9, 2023, 10 pages.

* cited by examiner

HYBRID GLOBAL LOCATION TRACKING SYSTEM

RELATED APPLICATIONS

This application claims the benefit of U.S. provisional patent application Ser. No. 63/320,483, filed on Mar. 16, 2022, and U.S. provisional patent application Ser. No. 63/389,983, filed on Jul. 18, 2022, the disclosures of which are hereby incorporated herein by reference in their entireties.

FIELD OF THE DISCLOSURE

The technology of the disclosure relates generally to a hybrid global location tracking system and, more specifically, a global location tracking system based on a hybrid of ultra-wideband (UWB) and global positioning system (GPS) technologies.

BACKGROUND

Ultra-wideband (UWB) is an Institute of Electrical and Electronic Engineers (IEEE) 802.15.4a/z standard technology optimized for secure micro-location-based applications. It is capable of measuring distance and location with extended range (e.g., up to 70 meters) and unprecedented accuracy (e.g., within a few centimeters), compared to such traditional narrowband technologies as Wi-Fi and Bluetooth. In addition to location capability, UWB can also offer a data communication pipe of 27+ Mbps. As such, UWB technology has been widely adopted in today's new smartphones and smart gadgets to enable spatial awareness in places where global positioning service (GPS) based positioning service is unavailable or unreliable and/or for fast and secure data collection from various sensors.

UWB based positioning service is enabled by transmitting a UWB pulse from a UWB anchor (e.g., smartphone) to a UWB tag (e.g., a sensor) and calculating the time it takes the UWB pulse to travel between the UWB anchor and the UWB tag and an angle-of-arrival (AoA) and/or angle-of-departure (AoD) of the UWB pulse relative to the UWB anchor. The UWB pulse is typically 2 nanoseconds (ns) wide and has clean edges, thus making it highly immune to reflected signals (e.g., multipath) and allowing a precise determination of arrival/departure time and distance in a multipath radio environment (e.g., an indoor environment).

Although the UWB tag can accurately measure the distance and the AoA relative to the UWB anchor, the UWB tag is unable to determine a global positioning location (latitude and longitude) without a global positioning receiver, such as a global positioning system (GPS) receiver. However, given that the UWB tag is typically powered by an embedded battery (e.g., a button battery) and confined to a smaller footprint, it may be impractical to include the global positioning receiver in the UWB tag. As such, it is desirable to determine the global positioning location of the UWB tag without incorporating the global positioning receiver into the UWB tag.

SUMMARY

Embodiments of the disclosure relate to a hybrid global location tracking system. The hybrid global location tracking system includes an anchor device(s) and multiple tag devices, each including an ultra-wideband (UWB) transceiver circuit. The anchor device(s) can broadcast a location request to wake up the tag devices for a location update. Notably, some of the tag devices may be located within a communication range of the anchor device(s) to receive the location request directly and relay the location request to some other tag devices located outside the communication range of the anchor device(s). In this regard, each of the tag devices can measure a distance and an angle (e.g., angle-of-arrival and/or angle-of-departure) based on the received location request and report the measured distance and angle to the anchor device(s), either directly or through another tag device(s) located within the communication range of the anchor device(s). In an embodiment, the anchor device(s) can also determine its own global positioning coordinate and orientation. Accordingly, a global positioning location can be determined for each tag device based on the global positioning coordinate and the orientation of the anchor device(s), and the distance and angle reported by the tag device, without requiring a global positioning receiver in the tag device.

In one aspect, a hybrid global location tracking system is provided. The hybrid global location tracking system includes an anchor device. The anchor device includes an UWB transceiver circuit. The UWB transceiver circuit is configured to broadcast a location request. The hybrid global location tracking system also includes multiple tag devices. Each of the multiple tag devices includes a respective UWB transceiver circuit. The respective UWB transceiver circuit is configured to receive one or more copies of the location request from one or more selected devices among the anchor device and the multiple tag devices. The respective UWB transceiver circuit is also configured to measure a distance and an angle relative to at least one of the one or more selected devices based on a respective one of the one or more copies of the location request. The respective UWB transceiver circuit is also configured to transmit to the at least one of the one or more selected devices a location response comprising the distance and the angle relative to the at least one of the one or more selected devices.

In another aspect, a method for operating a hybrid global location tracking system is provided. The method includes broadcasting a location request from an anchor device to multiple tag devices. The method also includes receiving, at each of the multiple tag devices, one or more copies of the location request from one or more selected devices among the anchor device and the multiple tag devices. The method also includes measuring, at each of the multiple tag devices, a distance and an angle relative to at least one of the one or more selected devices based on a respective one of the one or more copies of the location request. The method also includes transmitting, from each of the multiple tag devices, to the at least one of the one or more selected devices a location response comprising the distance and the angle relative to the at least one of the one or more selected devices.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
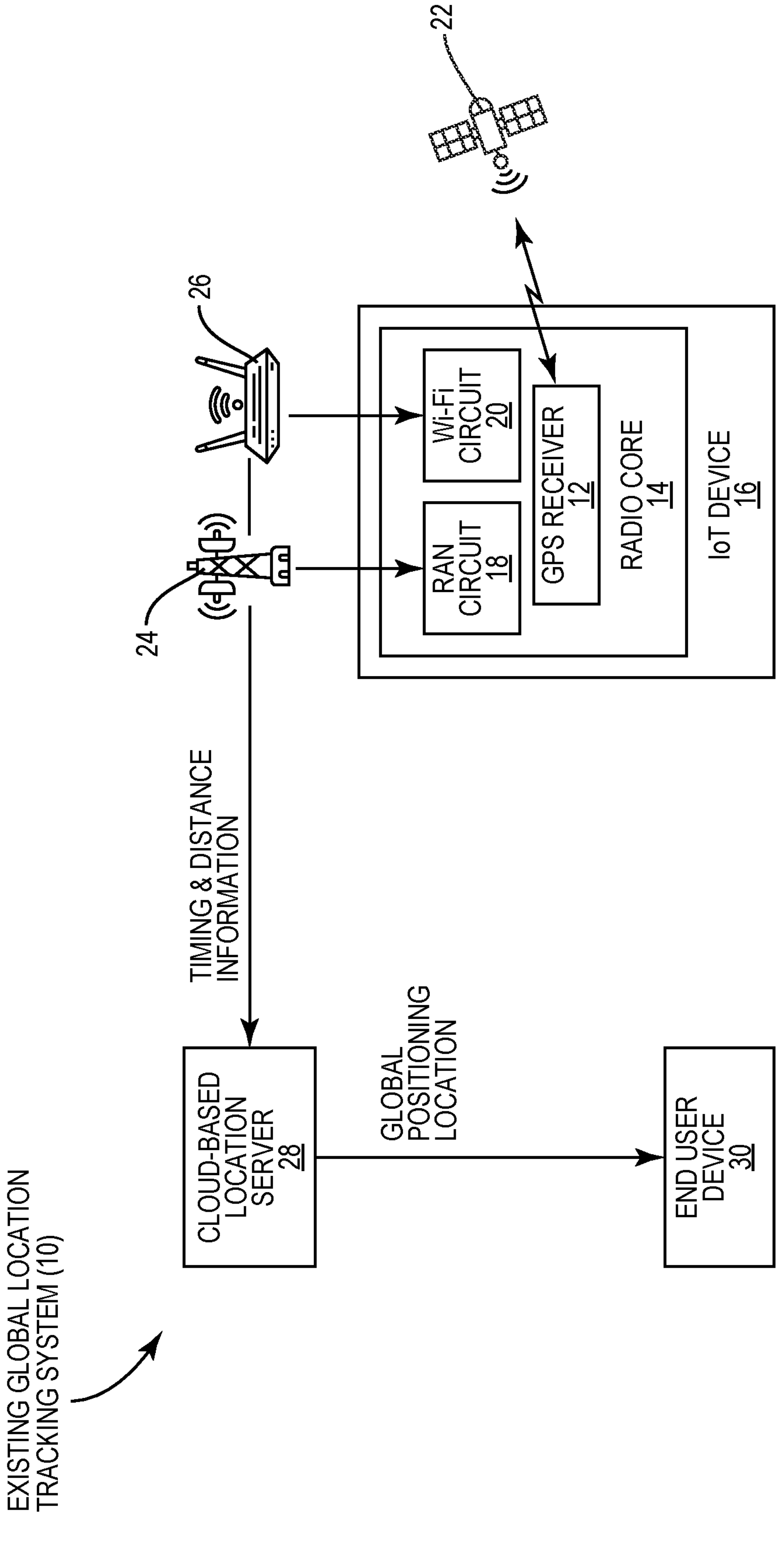
FIG. 1 (PRIOR ART)
FIG. 1 is a schematic diagram of an exemplary existing global location tracking system that requires a global positioning system (GPS) core to be incorporated in a radio core in an Internet-of-Things (IoT) device(s) for determining a global positioning location of the IoT device(s)

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a hybrid global location tracking system. The hybrid global location tracking system includes an anchor device(s) and multiple tag devices, each including an ultra-wideband (UWB) transceiver circuit. The anchor device(s) can broadcast a location request to wake up the tag devices for a location update. Notably, some of the tag devices may be located within a communication range of the anchor device(s) to receive the location request directly and relay the location request to some other tag devices located outside the communication range of the anchor device(s). In this regard, each of the tag devices can measure a distance and an angle (e.g., angle-of-arrival and/or angle-of-departure) based on the received location request and report the measured distance and angle to the anchor device(s), either directly or through another tag device(s) located within the communication range of the anchor device(s). In an embodiment, the anchor device(s) can also determine its own global positioning coordinate and orientation. Accordingly, a global positioning location can be determined for each tag device based on the global positioning coordinate and the orientation of the anchor device(s), and the distance and angle reported by the tag device, without requiring a global positioning receiver in the tag device.

Before discussing the hybrid global location tracking system of the present disclosure, starting at FIG. 2, a brief overview of an existing global location tracking system is first discussed with reference to FIG. 1 to help understand the shortcomings of an existing solution for determining a global positioning location of an Internet-of-Things (IoT) device(s).

FIG. 1 is a schematic diagram of an existing global location tracking system 10 that requires a global positioning system (GPS) receiver 12 to be incorporated into a radio core 14 in an IoT device(s) 16 for determining a global positioning location of the IoT device(s) 16. The radio core 14 already includes a radio access network (RAN) transceiver circuit 18, such as a long-term evolution (LTE) transceiver circuit, and a Wi-Fi transceiver circuit 20. The GPS receiver 12, on the other hand, may be implemented in the radio core 14 as a software intellectual property (IP) to operate based on existing radio and computing capabilities of the radio core 14.

The IoT device(s) 16 is configured to use local resources to extract timing and distance information from a satellite(s) 22, a RAN base station(s) 24, and a Wi-Fi access point(s) 26.

The IoT device(s) 16 then transmits the obtained timing and distance information to a cloud-based location server 28, for example, via the RAN base station(s) 24 and/or the Wi-Fi access point(s) 26. The cloud-based location server 28 processes the timing and distance information to thereby make a global positioning location (latitude, longitude) of the IoT device(s) 16 available to an end user device 30.

Despite that the GPS receiver 12 can be implemented as software IP in the radio core 14, the radio core 14 nevertheless still relies on the RAN transceiver circuit 18 and/or the Wi-Fi transceiver circuit 20 to communicate with the cloud-based location server 28. Knowing that the RAN transceiver circuit 18 and the Wi-Fi transceiver circuit 20 are both bulky in size and hungry in power, it is thus desirable to replace the radio core 14 with an alternative radio circuit that can operate with a smaller footprint and reduced power consumption.

Figure 2:
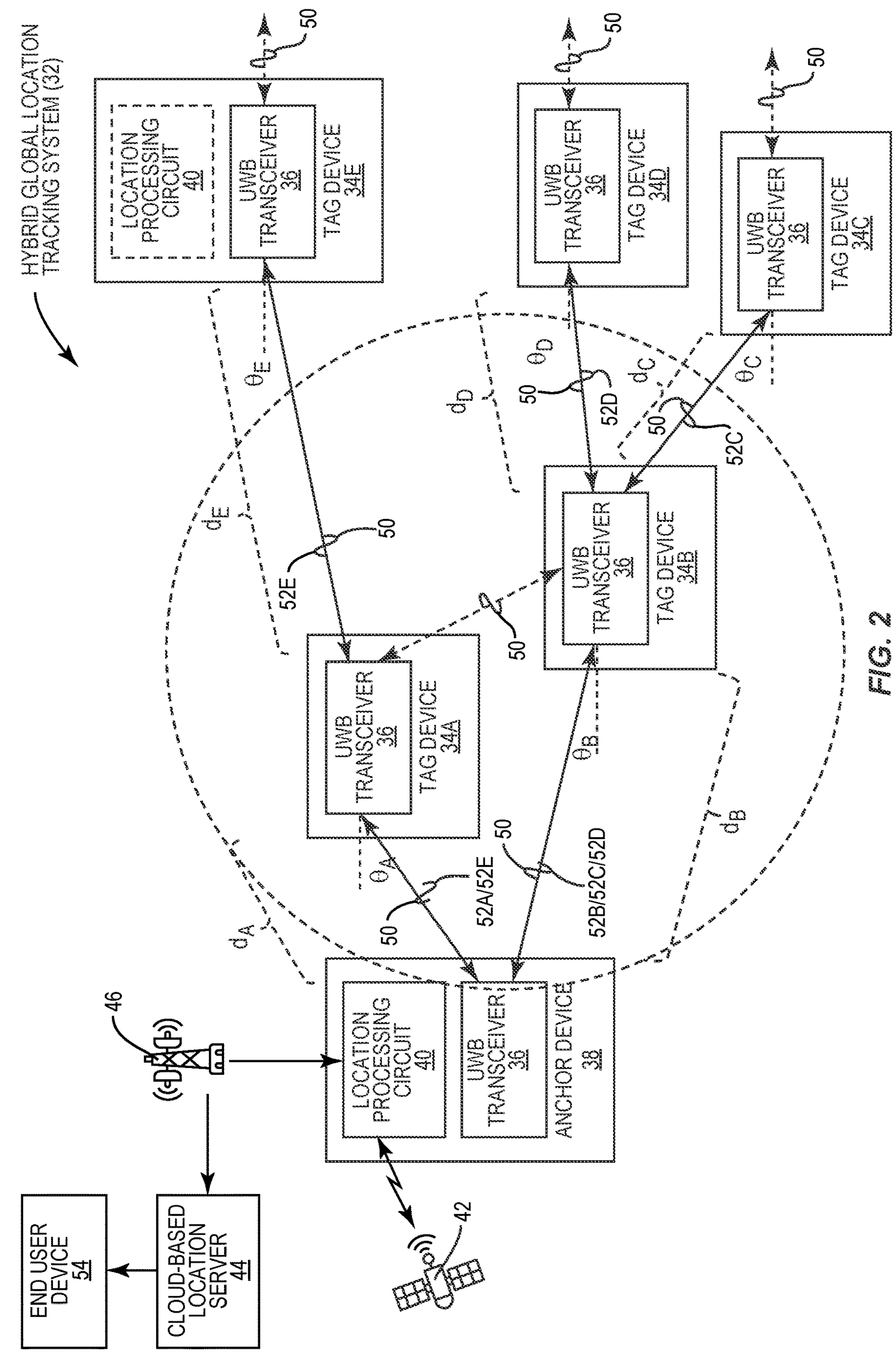
FIG. 2 is a schematic diagram of an exemplary hybrid global location tracking system wherein an anchor device is configured according to embodiments of the present disclosure to determine global positioning locations for multiple tag devices.

In this regard, FIG. 2 is a schematic diagram of an exemplary hybrid global location tracking system 32 configured according to embodiments of the present disclosure to determine global positioning locations for multiple tag devices 34A, 34B, 34C, 34D, and 34E without requiring a global positioning receiver (e.g., a GPS receiver) in the tag devices 34A, 34B, 34C, 34D, and 34E. Notably, the tag devices 34A, 34B, 34C, 34D, and 34E are merely provided herein for the sake of illustration and reference. It should be appreciated that the hybrid global location tracking system 32 can be configured to determine global positioning locations for any suitable number of tag devices according to embodiments described herein.

In an embodiment, each of the tag devices 34A, 34B, 34C, 34D, and 34E includes an UWB transceiver circuit 36 that is configured to transmit and receive impulse radio signals based on the physical layer (PHY) and medium access control (MAC) layer configurations as defined in the Institute of Electrical and Electronic Engineers (IEEE) 802.15.4a/z standard. Herein, each of the tag devices 34A, 34B, 34C, 34D, and 34E is not configured to include any other type of radio transceiver circuit, including but not limited to RAN transceiver circuit, Wi-Fi transceiver circuit, Bluetooth® transceiver circuit, and GPS receiver circuit.

The hybrid global location tracking system 32 further includes at least one anchor device 38 (e.g., smartphone or tablet) that further includes a location processing circuit 40 in addition to the UWB transceiver circuit 36. In a non-limiting example, the location processing circuit 40 includes a global positioning receiver (e.g., GPS receiver) and a RAN transceiver circuit, which are not shown herein for the sake of brevity. The global positioning receiver is configured to obtain a global positioning coordinate (latitude, longitude) of the anchor device 38 via a satellite(s) 42 and communicate with a cloud-based location server 44 via a RAN base station(s) 46. The location processing circuit 40 may further include a compass (not shown) for determining an orientation of the anchor device(s) 38. The anchor device 38 may also determine the orientation based on alternative means if the compass is not available. In one example, the location processing circuit 40 can use an inertial measurement unit (IMU) motion sensor to detect related vector motion relative to the global positioning location and extrapolate the orientation accordingly. In another example, the location processing circuit can collaborate with other anchor devices with GPS capabilities.

In an embodiment, the UWB transceiver circuit 36 in each of the tag devices 34A, 34B, 34C, 34D, and 34E can further include a UWB wakeup receiver (not shown) and a main UWB transceiver (not shown). In an embodiment, the main UWB transceiver will stay in power-saving mode as much as possible to help conserve power. The wakeup receiver, on the other hand, will monitor a wakeup impulse sequence transmitted from the anchor device 38. In response to detecting the wakeup impulse sequence, the wakeup receiver will wake up the main UWB transceiver circuit to communicate UWB PHY and MAC packets with the anchor device 38 and/or any other ones of the tag devices 34A, 34B, 34C, 34D, and 34E.

In a non-limiting example, the tag devices 34A and 34B are located within a communication range 48 of the anchor device 38, while the tag devices 34C, 34D, and 34E are located outside the communication range 48 of the anchor device 38. In this regard, the tag devices 34A and 34B can communicate directly with the anchor device 38. In addition, the tag devices 34A and 34B are further configured to act as relay nodes to bridge communications between the anchor device 38 and the tag devices 34C, 34D, and 34E. In this regard, the tag devices 34A, 34B, 34C, 34D, and 34E are configured to operate based on an UWB mesh network, which may operate based on similar or identical principles as a Wi-Fi mesh network. For the purpose of distinction, the tag devices 34A and 34B are also referred to as "first tag devices" and the tag devices 34C, 34D, and 34E are also referred to as "second tag devices" hereinafter.

In an embodiment, the anchor device 38 is configured to broadcast a location request 50, which can be made in response to receiving a request from the cloud-based location server 44. In one embodiment, the location request 50 may function as the wakeup impulse sequence to wake up each of the tag devices 34A, 34B, 34C, 34D, and 34E.

The first tag devices 34A and 34B each receives the location request 50 directly from the anchor device 38. Accordingly, the first tag devices 34A and 34B each measures a distance and an angle-of-arrival (AoA) and/or angle-of-departure (AoD) relative to the anchor device 38 based on the received location request 50. For example, the first tag device 34A measures a respective distance $d_A$ and a respective AoA $\theta_A$ relative to the anchor device 38 based on the location request 50 received directly from the anchor device 38. Accordingly, the first tag device 34A can transmit a respective location response 52A to report the measured distance $d_A$ and the measured AoA/AoD $\theta_A$ to the anchor device 38. Similarly, the first tag device 34B measures a respective distance $d_B$ and a respective AoA/AoD $\theta_B$ relative to the anchor device 38 based on the location request 50 received directly from the anchor device 38. Accordingly, the first tag device 34B can transmit a respective location response 52B to report the measured distance $d_B$ and the measured AoA/AoD $\theta_B$ relative to the anchor device 38.

In an embodiment, each of the first tag devices 34A and 34B is further configured to rebroadcast the location request 50 to the second tag devices 34C, 34D, and 34E that were unable to receive the location request 50 directly from the anchor device 38. In a non-limiting example, the location request 50 relayed by the first tag device 34A is received by the second tag device 34E, and the location request 50 relayed by the first tag device 34B is received by the second tag devices 34C and 34D. Accordingly, each of the second tag devices 34C, 34D, and 34E is configured to measure a respective distance and a respective AoA/AoD relative to the first tag devices 34A and 34B from whom the relayed location request 50 is received.

For example, the second tag device 34C receives the relayed location request 50 from the first tag device 34B and measures a respective distance $d_C$ and a respective AoA/AoD $\theta_C$ relative to the first tag device 34B. Accordingly, the second tag device 34C sends a respective location response 52C, which includes the measured distance $d_C$ and the measured AoA/AoD $\theta_C$ relative to the first tag device 34B, to the anchor device 38 via the first tag device 34B. In addition, the second tag device 34C may relay the location request 50 to any other tag devices (not shown) in the hybrid global location tracking system 32.

Similarly, the second tag device 34D also receives the relayed location request 50 from the first tag device 34B and measures a respective distance $d_D$ and a respective AoA/AoD $\theta_D$ relative to the first tag device 34B. Accordingly, the second tag device 34D sends a respective location response 52D, which includes the measured distance $d_D$ and the measured AoA/AoD $\theta_D$ relative to the first tag device 34B, to the anchor device 38 via the first tag device 34B. In addition, the second tag device 34D may relay the location request 50 to any other tag devices (not shown) in the hybrid global location tracking system 32.

Likewise, the second tag device 34E receives the relayed location request 50 from the first tag device 34A and measures a respective distance $d_E$ and a respective AoA/AoD $\theta_E$ relative to the first tag device 34A. Accordingly, the second tag device 34E sends a respective location response 52E, which includes the measured distance $d_E$ and the measured AoA/AoD $\theta_E$ relative to the first tag device 34A, to the anchor device 38 via the first tag device 34A. In addition, the second tag device 34E may relay the location request 50 to any other tag devices (not shown) in the hybrid global location tracking system 32.

Since each of the tag devices 34A, 34B, 34C, 34D, and 34E can rebroadcast the location request 50, it is possible that each of the tag devices 34A, 34B, 34C, 34D, and 34E can receive the location request 50 from additional sources. For example, the first tag device 34B can receive the location request 50 rebroadcasted by the first tag device 34A, and the first tag device 34A can receive the location request 50 rebroadcasted by the first tag device 34B. Likewise, the second tag device 34C may receive the location request 50 rebroadcasted by the second tag device 34D, 34E, the second tag device 34D may receive the location request 50 rebroadcasted by the second tag device 34C, 34E, and the second tag device 34E may receive the location request 50 rebroadcasted by the second tag device 34C, 34D. In this regard, each of the tag devices 34A, 34B, 34C, 34D, and 34E may perform additional distance and/or AoA/AoD measurements based on the additional relayed location request 50. Alternatively, each of the tag devices 34A, 34B, 34C, 34D, and 34E may ignore these additional relayed location requests 50. In an embodiment, each of the tag devices 34A, 34B, 34C, 34D, and 34E can be individually configured as to how the distance and AoA/AoD measurements should be performed.

Continuing with the example in FIG. 2, the anchor device 38 receives the location responses 52A, 52B, 52C, 52D, and 52E that are generated by the tag devices 34A, 34B, 34C, 34D, and 34E, respectively. As mentioned earlier, the location processing circuit 40 has obtained the global positioning location (latitude, longitude) and map orientation of the anchor device 38. As such, the location processing circuit 40 can further determine the global positioning locations for each of the tag devices 34A, 34B, 34C, 34D, and 34E.

For example, the location processing circuit 40 can determine the global positioning location of the tag device 34A based on the global positioning location (latitude, longitude) and map orientation of the anchor device 38 in conjunction with the distance $d_A$ and the AoA/AoD $\theta_A$ reported by the tag device 34A. Subsequently, the location processing circuit 40 can further determine the global positioning location of the tag device 34E based on the determined global positioning location of the tag device 34A in conjunction with the distance $d_E$ and the AoA/AoD $\theta_E$ reported by the tag device 34E. By repeating the same process, the location processing circuit 40 can determine the global positioning locations of the tag devices 34B, 34C, and 34D as well. The anchor device 38 can provide the determined global positioning locations of the tag devices 34A, 34B, 34C, 34D, and 34E to the cloud-based location server 44, which will in turn make such global positioning locations available to an end user device(s) 54.

In an alternative embodiment, instead of determining the global positioning locations for the tag devices 34A, 34B, 34C, 34D, and 34E locally, the anchor device 38 may send raw data to the cloud-based location server 44. For example, the anchor device 38 can send the global positioning location and orientation of the anchor device 38, the measured distances $d_A$, $d_B$, $d_C$, $d_D$, $d_E$, and the measured AoAs/AoDs $\theta_A$, $\theta_B$, $\theta_C$, $\theta_D$, $\theta_E$ to the cloud-based location server 44. The cloud-based location server 44, in turn, will determine the global positioning locations of the tag devices 34A, 34B, 34C, 34D, and 34E and make such information available to the end user device(s) 54.

In some embodiments, there may be more than one device having the GPS capabilities in the hybrid global location tracking system 32. In a non-limiting example, the tag device 34E may also include the location processing circuit 40. In this regard, the cloud-based location server 44 may determine a best-possible anchor device to act as the anchor device based on such factors as position in the mesh network, battery capacity, etc. Accordingly, the cloud-based location server 44 may send the location request 50 to the determined best-possible anchor device, such as the anchor device 38. As for the tag device 34, it is possible to turn off the location processing circuit 40 to conserve power.

Figure 3:
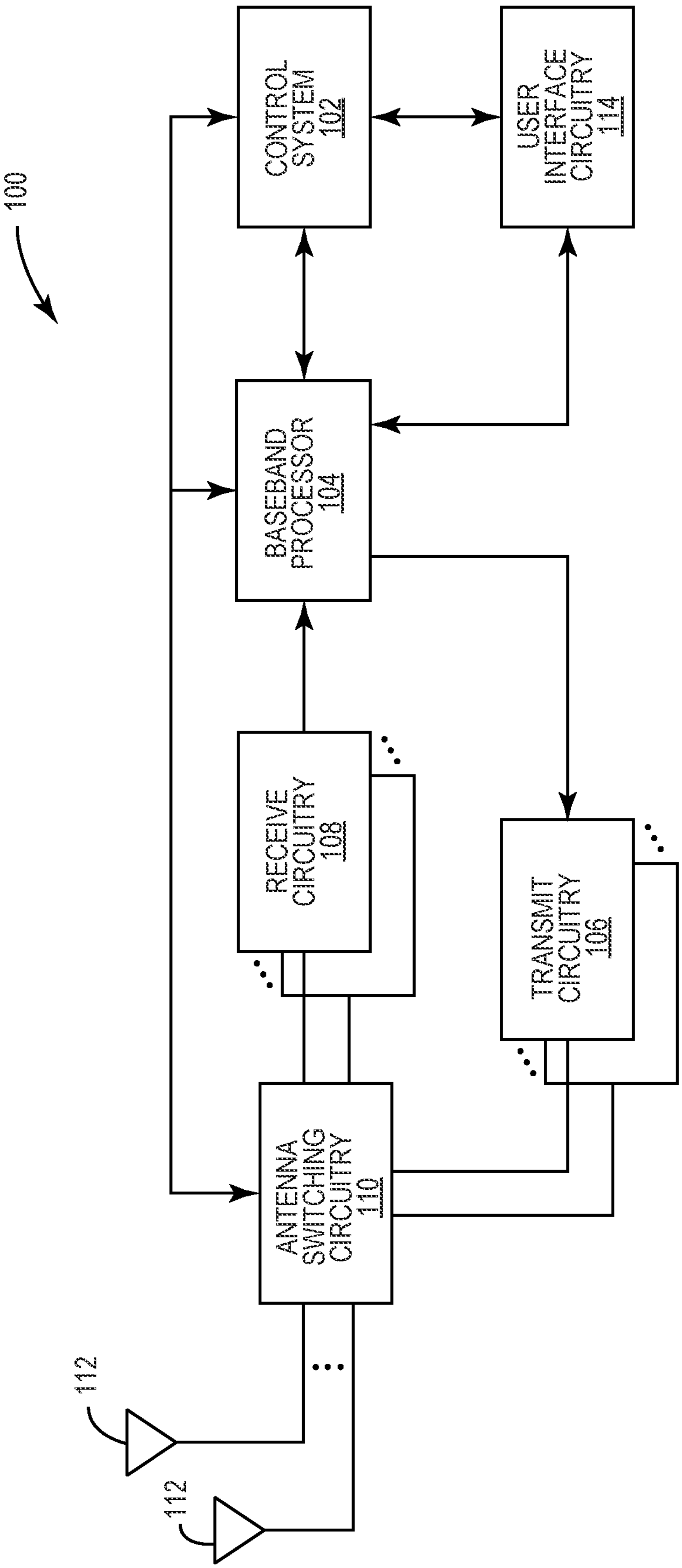
FIG. 3 is a schematic diagram of an exemplary user element wherein the anchor device in FIG. 2 can be provided.

The anchor device 38 in FIG. 2 can be provided in a user element to operate in the hybrid global location tracking system 32 of FIG. 2 according to embodiments described above. In this regard, FIG. 3 is a schematic diagram of an exemplary user element 100 wherein the anchor device 38 in FIG. 2 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

Figure 4:
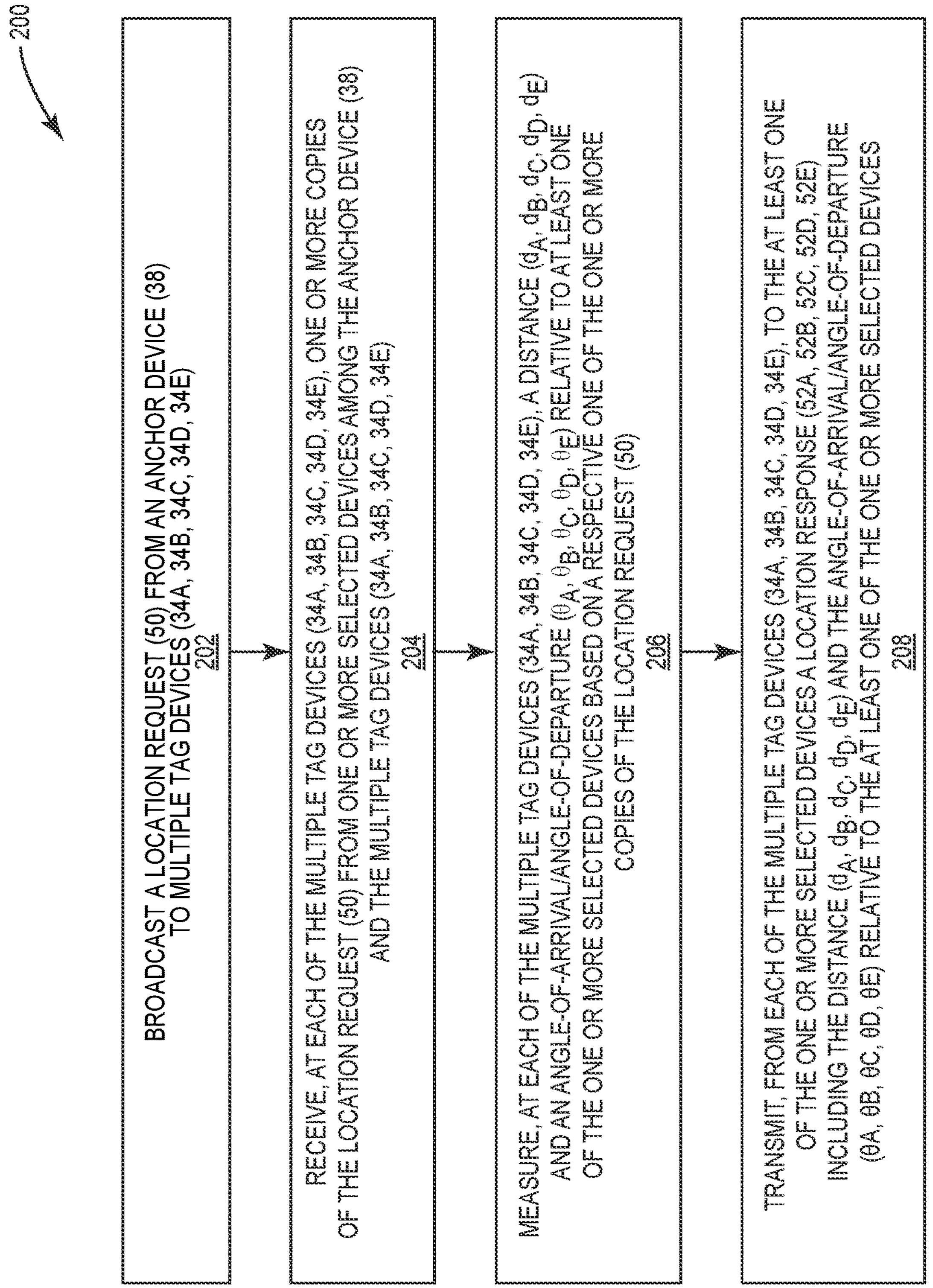
FIG. 4 is a flowchart of an exemplary process that can be employed for operating the hybrid global location tracking system of FIG. 2.

The hybrid global location tracking system 32 of FIG. 2 can be configured to operate based on a process. In this regard, FIG. 4 is a flowchart of an exemplary process 200 based on which the hybrid global location tracking system 32 of FIG. 2 can operate.

Herein, the anchor device 38 broadcasts the location request 50 to the tag devices 34A, 34B, 34C, 34D, 34E (step 202). Each of the tag devices 34A, 34B, 34C, 34D, 34E receives one or more copies of the location request 50 from one or more selected devices among the anchor device 38 and the tag devices 34A, 34B, 34C, 34D, 34E (step 204). Each of the tag devices 34A, 34B, 34C, 34D, 34E then measures a respective one of the distances $d_A$, $d_B$, $d_C$, $d_D$, $d_E$ and a respective one of the AoAs/AoDs $\theta_A$, $\theta_B$, $\theta_C$, $\theta_D$, $\theta_E$ relative to at least one of the one or more selected devices based on a respective one of the one or more copies of the location request 50 (step 206). Subsequently, each of tag devices 34A, 34B, 34C, 34D, 34E transmits to the at least one of the one or more selected devices a respective one of the location responses 52A, 52B, 52C, 52D, 52E that includes the respective one of the distances $d_A$, $d_B$, $d_C$, $d_D$, $d_E$ and the respective one of the AoAs/AoDs $\theta_A$, $\theta_B$, $\theta_C$, $\theta_D$, $\theta_E$ relative to the at least one of the one or more selected devices (step 208).

Those skilled in the art will recognize improvements and modifications to the preferred embodiments of the present disclosure. All such improvements and modifications are considered within the scope of the concepts disclosed herein and the claims that follow.

What is claimed is:

1. A hybrid global location tracking system comprising:
- an anchor device comprising an ultra-wideband (UWB) transceiver circuit configured to broadcast a location request; and
- a plurality of tag devices each comprising a respective UWB transceiver circuit and without any other type of radio transceiver circuit, the respective UWB transceiver circuit is configured to:
  - receive one or more copies of the location request from one or more selected devices among the anchor device and the plurality of tag devices;
  - measure a distance and an angle relative to at least one of the one or more selected devices based on a respective one of the one or more copies of the location request; and
  - transmit to the at least one of the one or more selected devices a location response comprising the distance and the angle relative to the at least one of the one or more selected devices.

2. The hybrid global location tracking system of claim 1, wherein each of the plurality of tag devices further comprises a respective wakeup receiver configured to wake up the respective UWB transceiver circuit in response to receiving any of the one or more copies of the location request.

3. The hybrid global location tracking system of claim 1, wherein the plurality of tag devices comprises:
- one or more first tag devices located within a communication range of the anchor device; and
- one or more second tag devices located outside the communication range of the anchor device.

4. The hybrid global location tracking system of claim 3, wherein each of the one or more first tag devices is further configured to:
- receive the location request directly from the anchor device;
- measure the distance and the angle relative to the anchor device based on the location request received from the anchor device; and
- transmit to the anchor device the location response comprising the measured distance and the measured angle relative to the anchor device.

5. The hybrid global location tracking system of claim 4, wherein each of the one or more first tag devices is further configured to relay the location request received from the anchor device to any of the one or more second tag devices.

6. The hybrid global location tracking system of claim 5, wherein each of the one or more second tag devices is configured to:
- receive the location request relayed from at least one of the one or more first tag devices;
- measure the distance and the angle relative to the at least one of the one or more first tag devices based on the location request relayed by the at least one of the one or more first tag devices; and
- transmit to the at least one of the one or more first tag devices the location response comprising the' measured distance and the measured angle relative to the at least one of the one or more first tag devices.

7. The hybrid global location tracking system of claim 6, wherein each of the one or more first tag devices is further configured to relay the location response received from any of the one or more second tag devices to the anchor device.

8. The hybrid global location tracking system of claim 1, wherein the anchor device further comprises a location processing circuit configured to obtain a global positioning coordinate and an orientation of the anchor device.

9. The hybrid global location tracking system of claim 8, wherein the location processing circuit comprises:
- a global positioning system (GPS) receiver configured to obtain the global positioning coordinate of the anchor device; and
- a compass configured to determine the orientation of the anchor device.

10. The hybrid global location tracking system of claim 9, wherein none of the plurality of tag devices is configured to include the GPS receiver.

11. The hybrid global location tracking system of claim 8, wherein the location processing circuit is further configured to determine a global positioning location for each of the plurality of tag devices based on:

the distance and the angle measured by each of the plurality of tag devices; and the global positioning coordinate and the orientation of the anchor device.

12. The hybrid global location tracking system of claim 11, wherein the anchor device is further configured to report to a cloud-based location server the global positioning location determined for each of the plurality of tag devices.

13. A method for operating a hybrid global location tracking system comprising:

broadcasting a location request from an anchor device to a plurality of tag devices each comprising a respective ultra-wideband (UWB) transceiver circuit and without any other type of radio transceiver circuit;

receiving, via the respective UWB transceiver circuit in each of the plurality of tag devices, one or more copies of the location request from one or more selected devices among the anchor device and the plurality of tag devices;

measuring, at each of the plurality of tag devices, a distance and an angle relative to at least one of the one or more selected devices based on a respective one of the one or more copies of the location request; and transmitting, from each of the plurality of tag devices, to the at least one of the one or more selected devices a location response comprising the distance and the angle relative to the at least one of the one or more selected devices.

14. The method of claim 13, further comprising:

providing one or more first tag devices within a communication range of the anchor device; and providing one or more second tag devices outside the communication range of the anchor device.

15. The method of claim 14, further comprising:

receiving, at each of the one or more first tag devices, the location request directly from the anchor device;

measuring, at each of the one or more first tag devices, the distance and the angle relative to the anchor device based on the location request received from the anchor device; and transmitting, from each of the one or more first tag devices, to the anchor device the location response comprising the measured distance and the measured angle relative to the anchor device.

16. The method of claim 15, further comprising relaying, at each of the one or more first tag devices, the location request received from the anchor device to any of the one or more second tag devices.

17. The method of claim 16, further comprising:

receiving, at each of the one or more second tag devices, the location request relayed from at least one of the one or more first tag devices;

measuring, at each of the one or more second tag devices, the distance and the angle relative to the at least one of the one or more first tag devices based on the location request relayed by the at least one of the one or more first tag devices; and transmitting, from each of the one or more second tag devices, to the at least one of the one or more first tag devices the location response comprising the measured distance and the measured angle relative to the at least one of the one or more first tag devices.

18. The method of claim 17, further comprising relaying, from each of the one or more first tag devices, the location response received from any of the one or more second tag devices to the anchor device.

19. The method of claim 13, further comprising determining, at the anchor device, a global positioning location for each of the plurality of tag devices based on:

the distance and the angle measured by each of the plurality of tag devices; and a global positioning coordinate and an orientation of the anchor device.

20. The method of claim 19, further comprising reporting, from the anchor device to a cloud-based location server, the global positioning location determined for each of the plurality of tag devices.

21. A tag device among a plurality of tag devices each comprising an ultra-wideband (UWB) transceiver circuit and without any other type of radio transceiver circuit, the UWB transceiver circuit is configured to:

receive one or more copies of a location request from one or more selected devices among an anchor device and the plurality of tag devices;

measure a distance and an angle relative to at least one of the one or more selected devices based on a respective one of the one or more copies of the location request; and transmit to the at least one of the one or more selected devices a location response comprising the distance and the angle relative to the at least one of the one or more selected devices.

22. The tag device of claim 21, further comprising a respective wakeup receiver configured to wake up the respective UWB transceiver circuit in response to receiving any of the one or more copies of the location request.

23. The tag device of claim 21, configured to operate as one of a first tag device located within a communication range of the anchor device and a second tag device located outside the communication range of the anchor device.

24. The tag device of claim 23, wherein the first tag device is configured to:

receive the location request directly from the anchor device;

measure the distance and the angle relative to the anchor device based on the location request received from the anchor device; and transmit to the anchor device the location response comprising the measured distance and the measured angle relative to the anchor device.

25. The tag device of claim 24, wherein the first tag device is further configured to relay the location request received from the anchor device to the second tag device.

26. The tag device of claim 25, wherein the second tag device is configured to:

receive the location request relayed from the first tag device;

measure the distance and the angle relative to the first tag device based on the location request relayed by the first tag device; and transmit to the first tag device the location response comprising the measured distance and the measured angle relative to the first tag device.

27. The tag device of claim 26, wherein the first tag device is further configured to relay the location response received from the second tag device to the anchor device.

28. The tag device of claim 21, configured not to include a global positioning system (GPS) receiver.

29. A method for operating a tag device among a plurality of tag devices each comprising an ultra-wideband (UWB) transceiver circuit and without any other type of radio transceiver circuit, comprising:

receiving one or more copies of a location request from one or more selected devices among an anchor device and the plurality of tag devices;

measuring a distance and an angle relative to at least one of the one or more selected devices based on a respective one of the one or more copies of the location request; and transmitting to the at least one of the one or more selected devices a location response comprising the distance and the angle relative to the at least one of the one or more selected devices.

30. The method of claim 29, further comprising waking up the respective UWB transceiver circuit in response to receiving any of the one or more copies of the location request.

31. The method of claim 29, configuring the tag device to operate as one of a first tag device located within a communication range of the anchor device and a second tag device located outside the communication range of the anchor device.

32. The method of claim 31, further comprising:

receiving, by the first tag device, the location request directly from the anchor device;

measuring, by the first tag device, the distance and the angle relative to the anchor device based on the location request received from the anchor device; and transmitting from the first tag device to the anchor device the location response comprising the measured distance and the measured angle relative to the anchor device.

33. The method of claim 32, further comprising relaying, by the first tag device, the location request received from the anchor device to the second tag device.

34. The method of claim 33, further comprising:

receiving, by the second tag device, the location request relayed from the first tag device;

measuring, by the second tag device, the distance and the angle relative to the first tag device based on the location request relayed by the first tag device; and transmitting from the second tag device to the first tag device the location response comprising the measured distance and the measured angle relative to the first tag device.

35. The method of claim 34, further comprising relaying, by the first tag device, the location response received from the second tag device to the anchor device.

36. The method of claim 29, further comprising configuring the tag device not to include a global positioning system (GPS) receiver.

* * * * *